(12) United States Patent
Lemke et al.

(10) Patent No.: US 7,353,036 B2
(45) Date of Patent: Apr. 1, 2008

(54) PUSH-TO-TALK REVERSE CHANNEL ESTABLISHMENT

(75) Inventors: Mark R. Lemke, Mundelein, IL (US); Jerome O. Vogedes, Wind Lake, WI (US); Robert Patzer, Utica, MI (US)

(73) Assignee: Motorola, Inc., Schaumburg, IL (US)

( * ) Notice: Subject to any disclaimer, the term of this patent is extended or adjusted under 35 U.S.C. 154(b) by 634 days.

(21) Appl. No.: 10/842,674

(22) Filed: May 10, 2004

(65) Prior Publication Data

US 2005/0250523 A1    Nov. 10, 2005

(51) Int. Cl.
*H04B 7/00*    (2006.01)
*H04Q 7/20*    (2006.01)

(52) U.S. Cl. .......... 455/509; 455/518; 455/519; 455/450; 455/452.1; 455/464; 370/341; 370/327

(58) Field of Classification Search ........ 455/517–520, 455/507–509, 524–526, 450, 452.1, 515, 455/464, 456.6, 566; 370/340, 341, 327, 370/329, 260, 312, 400
See application file for complete search history.

(56) References Cited

U.S. PATENT DOCUMENTS

| | | | |
|---|---|---|---|
| 4,399,555 A * | 8/1983 | MacDonald et al. ..... | 455/422.1 |
| 4,905,302 A * | 2/1990 | Childress et al. ......... | 455/515 |
| 5,530,914 A * | 6/1996 | McPheters ................. | 455/518 |
| 5,970,417 A * | 10/1999 | Toyryla et al. ............ | 455/519 |
| 6,178,166 B1 * | 1/2001 | Wilson et al. ............. | 370/335 |
| 6,484,037 B1 | 11/2002 | Schmidt et al. | |
| 6,519,239 B1 | 2/2003 | Panchal et al. | |
| 6,885,874 B2 * | 4/2005 | Grube et al. .............. | 455/520 |
| 6,898,436 B2 * | 5/2005 | Crockett et al. ........... | 455/518 |
| 6,963,543 B2 * | 11/2005 | Diep et al. ................. | 370/261 |
| 6,965,767 B2 * | 11/2005 | Maggenti et al. .......... | 455/416 |
| 6,996,414 B2 * | 2/2006 | Vishwanathan et al. ... | 455/518 |
| 7,047,031 B2 * | 5/2006 | Rosen et al. ............... | 455/518 |
| 2002/0172165 A1 | 11/2002 | Rosen et al. | |
| 2002/0177461 A1 | 11/2002 | Rosen et al. | |
| 2002/0181423 A1 * | 12/2002 | Chen et al. ................ | 370/337 |
| 2003/0017836 A1 | 1/2003 | Vishwanathan et al. | |
| 2003/0153343 A1 | 8/2003 | Crockett et al. | |

OTHER PUBLICATIONS

G. Madungwe and A. Bateman; A Protocol For Combining Voice And Data Traffic On A Trunked Multichannel PMR System; IEEE Sixth Annual Conference on Mobile Radio and Personal Communications, 1991; pp. 49-56.

(Continued)

*Primary Examiner*—Sujatha Sharma
(74) *Attorney, Agent, or Firm*—Sylvia Chen (57) ABSTRACT

A push-to-talk (PTT) radio resource controller (441) establishes a "reverse" channel using a forward channel resource request module (461), a reverse channel resource request module (463), an allocation rules module (470) that is coupled to the forward channel resource request module (461) and the reverse channel resource request module (463), and a channel resource availability module (480) that is coupled to the allocation rules module (470). A method (300) for establishing a reverse channel in a PTT system initiates a forward PTT circuit (313) between an originating device and at least a first called device, initiates a first reverse PTT circuit (319) between the first called device and the originating device before releasing (329) the forward PTT circuit, and then releases (339) the first reverse PTT circuit.

20 Claims, 4 Drawing Sheets

OTHER PUBLICATIONS

Roger Dettmer; "Trunked Private Mobile Radio A Lead From The Electricity Industry"; IEE Review; Jun. 22, 1989; p. 223-226.

Victor C.M. Leung; "Protocol Design For Mobile Radio Group Communications Over Satellite"; IEEE Journal on Selected Areas in Communications; vol. 10, No. 8, Oct. 1992; p. 1351-1361.

S.R. Robson and M.C. Sinclair; "An Improved Channel Resource Queueing Algorithm For Trunked Mobile Radio"; 1995 The Institution of Electrical Engineers. Conference proceedings, pp. 17/1-17/10.

Luis Munos, Marta Garcia; "Voice And Data Services Over MPT13xx Trunking Systems"; International Conference on Personal Communications, IEEE 1997; pp. 593-597.

Zhang Zongjun, Lui Ui, Zhang Naitong, Wang Bin; "Simulation Analysis Of The Air Interface Protocol for TETRA System";APCC/OECC 99, 5th Asia Pacific Conference on Communications, vol. 1, 1999; pp. 558-561.

Dietrich Hunold, Andre Noll Barreto, Gerhard P. Fettweis, and Michael Mecking; "Concept for Universal Access and Connectivity in Mobile Radio Networks"; 2000 IEEE Eleventh International Symposium on Personal, Indoor and Mobile Communications, vol. 2; pp. 847-851.

Anthony Allen, Robert J. O'Dea, Sumit Talwalkar; Motorola Inc., Plantation, FL; "A Novel Public Mobile Radio (PMR) Protocol"; 2000 IEEE Eurocomm Proceedings; pp. 378-382.

* cited by examiner

PUSH-TO-TALK REVERSE CHANNEL ESTABLISHMENT

FIELD OF THE DISCLOSURE

This disclosure relates generally to push-to-talk (PTT) service in a cellular telephone communication system, and more particularly to reducing call set-up delay involved in establishing "reverse" channels during a PTT communications exchange.

BACKGROUND OF THE DISCLOSURE

Push-to-talk (PTT) refers to a half-duplex mode of communication during which a single user has mutually exclusive use of a wireless communication channel for the transmission of voice information to another user or group of users. From an operational viewpoint, originating party User A presses a PTT switch on a mobile device, possibly awaits a "ready" tone, speaks into a microphone of the mobile device, and then releases the PTT switch. At this point, a former called party User B can press a PTT switch, possibly await a "ready" tone, speak into the microphone, and release the PTT switch. This procedure is repeated with different parties becoming the originating user and transmitting to one or more called parties until the conversation has completed.

PTT service avoids the typical dialing and ringing sequence of standard telephony service and thus is quicker than standard telephony service. There is a time delay, however, between the moment that a user activates PTT service (usually indicated by pressing a PTT switch) and the moment a PTT circuit is set up (usually indicated by a "ready" tone). This time delay, known as the PTT call setup delay, is a critical parameter for PTT services. If the call set-up delay is larger than a user expects, the user may forget to wait for the "ready" tone and, instead, talk before the PTT traffic channel is set up. Talking before the PTT traffic channel is set up results in called users failing to hear at least part of the voice communications from the originating user, which results in an unfavorable user experience.

During a PTT circuit setup and teardown, a network's PTT radio resource controller passes through four fundamental states on a per-mobile basis. Initially, the PTT radio resource controller is in an idle state for a particular mobile device. When the PTT radio resource controller receives a communication request from that mobile device (e.g., a PTT switch is pressed on the mobile device, and the mobile device requests access on a signaling channel), the PTT radio resource controller goes to a busy state for the mobile device. The PTT radio resource controller next goes to a switch setup state when a radio channel is available, and the PTT radio resource controller goes to an active state when the PTT circuit setup is complete. While the PTT radio resource controller is in active state for a particular mobile device, that mobile device may transmit voice communications to one or more mobile devices over a PTT traffic channel. The PTT radio resource controller goes back to the idle state for that mobile device when the PTT traffic channel is no longer in use (e.g., there has been no activity on the PTT traffic channel for a predetermined period of time).

Because the PTT radio resource controller undergoes the same PTT circuit setup process for each mobile device, the average PTT call set-up delay is approximately equal each instance a user presses a PTT switch in a PTT communication exchange. Thus, there is an opportunity to reduce the average PTT call set-up delay for a party who is responding to a voice communication in an on-going PTT communication exchange.

The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A push-to-talk (PTT) radio resource controller establishes a "reverse" channel using a forward channel resource request module, a reverse channel resource request module, an allocation rules module that is coupled to the forward channel resource request module and the reverse channel resource request module, and a channel resource availability module that is coupled to the allocation rules module. A method for establishing a reverse channel in a PTT system initiates a forward PTT circuit between an originating device and at least a first called device, initiates a first reverse PTT circuit between the first called device and the originating device before releasing the forward PTT circuit, and then releases the first reverse PTT circuit.

Many PTT communication exchanges involve several sequential half-duplex speech bursts. An originating party requests a PTT communication with one or more called parties. After the originating party completes a voice communication, a called party can originate a subsequent voice communication to the group on a "reverse" channel. Further originating parties can participate in the communication exchange on further "reverse" channels.

If a PTT call is a one-to-one PTT call, then only a single called party has an opportunity to respond. In some one-to-many PTT calls, such as taxi cab dispatch, only one called party is expected to respond. In both of these common situations, initiating a "reverse" channel for the called party that is expected to respond before the called party activates a PTT communication (e.g., presses a PTT switch on the mobile device) can reduce call set-up delay when the called party wishes to respond.

Figure 1:
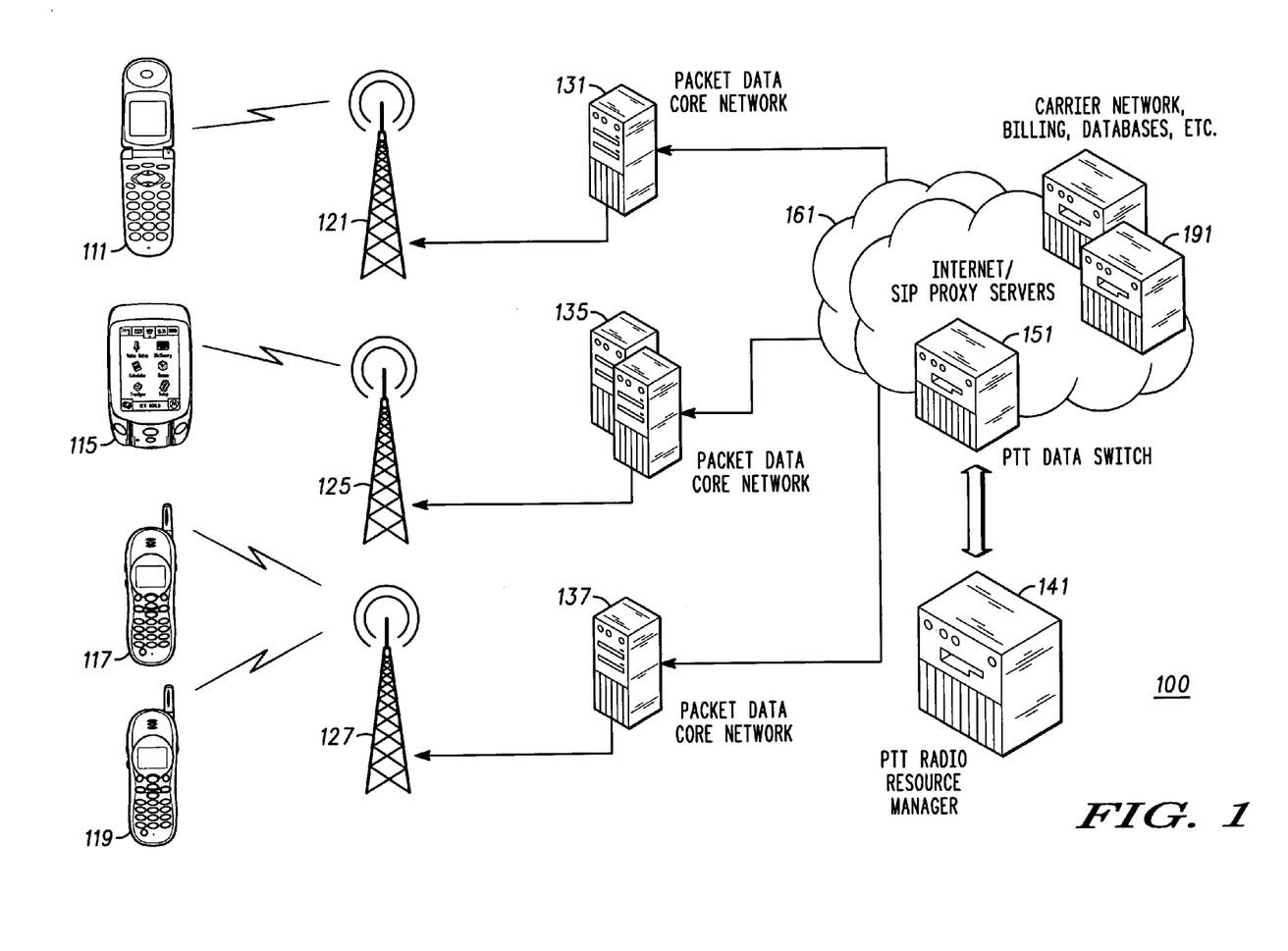
FIG. 1 shows a push-to-talk (PTT) system architecture according to a preferred embodiment.

FIG. 1 shows a push-to-talk (PTT) system architecture 100 according to a preferred embodiment. Push-to-talk systems, both terrestrial and satellite, generally utilize a network component (e.g., a PTT radio resource controller or other data control system or server) to (a) set up and control required radio resources and (b) establish and manage the switching of voice data.

In this PTT system architecture 100, an originating mobile device 111 wirelessly communicates with a radio access network 121. This radio access network 121 connects to a packet data core network 131 which in turn connects to a PTT radio resource manager 141 and a PTT data switch 151 through the Internet 161 or other data network. The PTT radio resource controller 141 (sometimes called a PTT radio resource manager) communicates with the PTT data switch 151 (sometimes called a PTT server). Other elements 191, such as billing servers, databases, and other equipment are also coupled to the network. Other packet data core networks 135, 137 are connected to the Internet 161, while other radio access networks 125, 127 are connected to the packet data core networks as shown. Called mobile devices 115, 117, 119 are wirelessly connected to one or more of the available radio access networks 121, 125, 127.

In this preferred embodiment, the PTT system architecture 100 is implemented as part of a Global System for Mobile communications (GSM) system, with the radio access networks being GSM General Packet Radio Service (GPRS) radio access networks and the packet data core networks 131, 135, 137 being Gateway GPRS Support Nodes (GGSNs) and Serving GPRS Support Nodes (SGSNs). Alternately, the PTT system architecture 100 can be implemented as part of a CDMA system, with the radio access networks 121, 125, 127 being CDMA 1× radio access networks and the packet data core networks 131, 135, 137 being Packet Data Switching Networks (PDSNs). The PTT system architecture can have additional or alternate radio access networks and core networks, including combinations and hybrids that develop as technology progresses.

In this example, an originating mobile device 111 wirelessly communicates with a radio access network 121. For the purposes of providing detail for this preferred embodiment, the originating mobile device 111 is a GSM device and the radio access network 121 is a GSM GPRS radio access network; however, alternate radio access networks are available as mentioned previously. The radio access network 125 connects to a packet data core network 135, implemented as an SGSN and GGSN, which in turn uses an Internet Protocol (IP) to connect to the PTT radio resource controller 141 and PTT data switch 151 through the Internet 161.

A called mobile device 115 wirelessly communicates with a different radio access network 125, which is also a GSM GPRS radio access network. The radio access network 125 connects to a packet data core network 135, implemented as another SGSN and GGSN, which in turn uses an Internet Protocol (IP) to connect to the PTT radio resource controller 141 and PTT data switch 151 through the Internet 161. Further called mobile devices 117, 119 wirelessly communicate with yet another radio access network 127. The radio access network 127 connects to a packet data core network 137, which in turn connects to the PTT radio resource controller 141 and PTT data switch 151 through the Internet 161.

Although the mobile devices 111, 115, 117, 119 are shown as wireless telephones and a personal digital assistant, one or more mobile devices could be implemented as other types of wireless device such as pocket personal computers or laptop computers.

If the mobile device 111 is operated by an originating party (User A), a signal goes from the mobile device 111 through the radio access network 121 and packet data core network 131 to the PTT radio resource controller 141, which sets up the path for voice data. Once the PTT circuit is set up, User A's voice data is sent from the mobile device 111 to the radio access network 121, to the packet data core network 131, and to the PTT data switch 151. The PTT data switch 151 forwards User A's voice data to the packet data core networks 135, 137 of the called parties, which in turn go to the radio access networks 125, 127 of the called parties and then the mobile devices 115, 117, 119 of the called parties. Any time after the PTT circuit is set up, the PTT radio resource controller sets up a reverse channel from the called party to the originating party. This reverse channel setup can occur before, during, or after voice communication, but should be initiated before the voice communication is completed. Ideally, this reverse channel setup is completed before the voice communication is completed.

After the originating party completes a voice communication with the called parties, a called party may respond on a reverse channel. As an example, a previous called party (User B of mobile device 115) becomes a current originating party, and the mobile device 115 of the current originating party transmits signaling information to the radio access network 125, through the packet data core network 135, to the PTT radio resource controller 141. Because the "reverse" channel is already set up, there is no need to experience a significant delay before User B's voice data is sent from the mobile device 115 to the radio access network 125, to the packet data core network 135, and to the PTT data switch 151. The PTT data switch 151 forwards User B's voice data to the packet data core networks 131, 137 of the called parties, which in turn go to the radio access networks 121, 127 of the called parties and then the mobile devices 111, 117, 119 of the called parties.

Because establishing a PTT channel can cause several seconds of delay (with certain worst-case scenarios being over 10 seconds), establishing a reverse channel can reduce delay. The trade-off is in reserving additional channel resources that may not be used. This trade-off, however, can be optimized in a number of ways. First, in a one-to-one PTT call, it is reasonable to expect a response from the called party and thus establish a single reverse channel. Second, various device-specific or user-specific mechanisms can reduce the need for reserving certain reverse channel resources, such as a time-out period for each reverse channel, a called party specifying that no reverse channel is needed (e.g., pressing a key), an originating party specifying which called parties are expected to need a reverse channel (e.g., using voice recognition "Eric, what do you think?").

Figure 2:
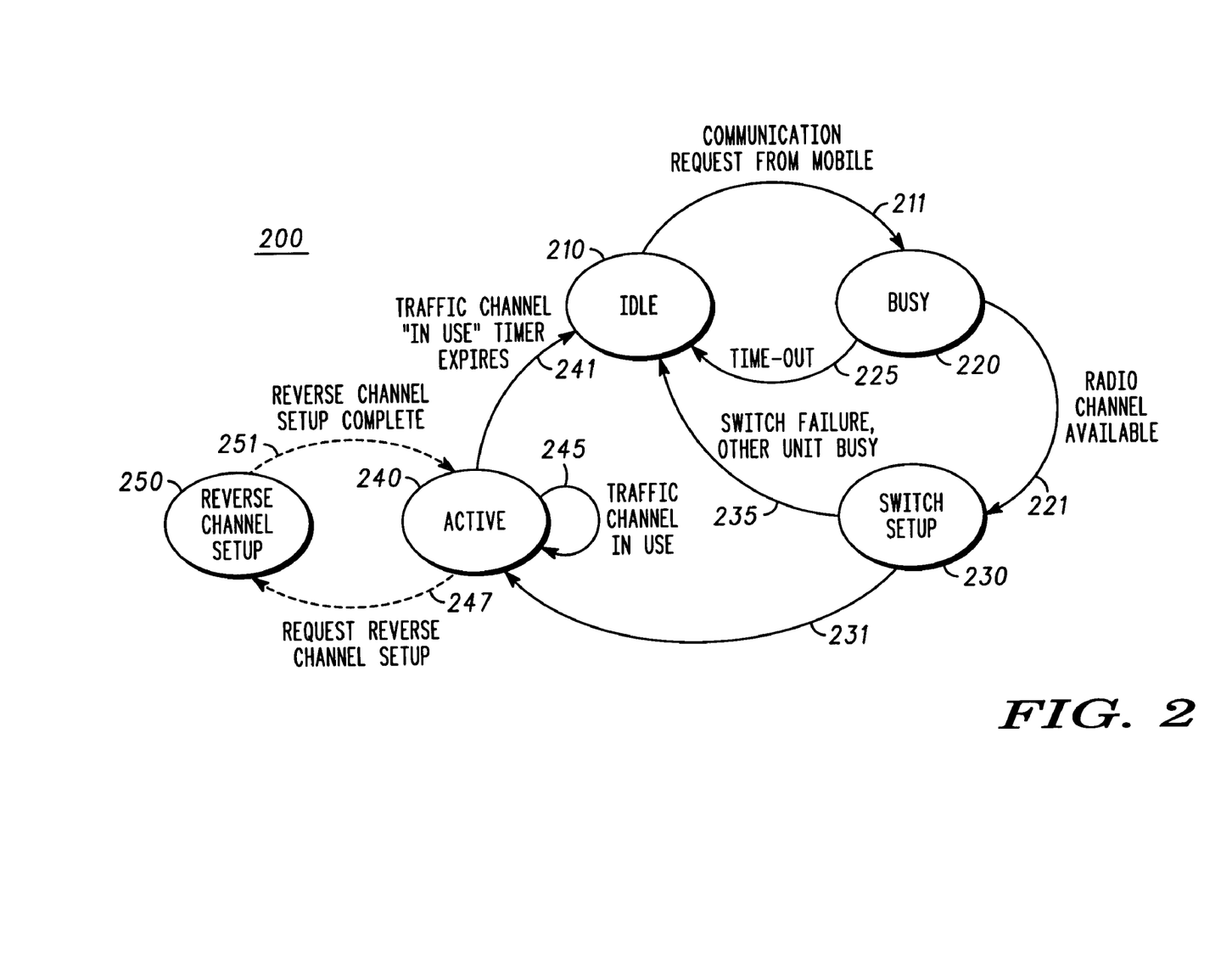
FIG. 2 shows a state diagram for a PTT radio resource controller according to the preferred embodiment.

FIG. 2 shows a state diagram 200 for a PTT radio resource controller according to the preferred embodiment. The mobile device can be one or more of the mobile devices 111, 115, 117, 119 shown in FIG. 1. If an originating device is calling only one device using PTT, then reverse channel setup is most efficient in terms of convenience for the two users, use of channel resources, and reducing PTT setup time. If an originating device is calling multiple devices using PTT, multiple reverse channels can be set up. Fewer than all the called parties can have a reverse channel if, for example, an originating device user is expecting a particular called party not to respond, or if an originating device user specifies only certain reverse channels to be set up, or if one or more called users decline a reverse channel setup.

In terms of radio resource management for PTT service, the network may be viewed on a per-mobile device basis as having five fundamental states: Idle state 210, Busy state 220, Switch Setup state 230, Active state 240, and Reverse Channel Setup state 250. In the Idle state 210, a given mobile device is not attempting nor actively engaged in communication. The Busy state 220 is used as a place-holder of sorts, for those times when radio resources are not available at the time a mobile device requests communication 211. In this embodiment, the network enqueues the request from the mobile device and goes into the Busy state 220 until radio resources are available 221 or the request times out 225.

At a time when radio resources are available, the network moves to the Switch Setup state 230 and requests 231 the creation of a virtual circuit between the originating device and the called device. If there is a switch failure or the called mobile device is busy 235, the network returns to the Idle state 210. Upon successful completion of the request 231, the PTT radio resource controller allocates radio resources to the mobile station and moves to the Active state 240. During the Active state 240, the mobile device actively uses the traffic channel 245. If an originating device expects a response from a called user, a request for reverse channel setup 247 causes the network to go to a Reverse Channel Setup state 250. Once the reverse channel setup is complete 251, the network returns to the Active state 240 until the traffic channel "in use" timer expires 241.

Figure 3:
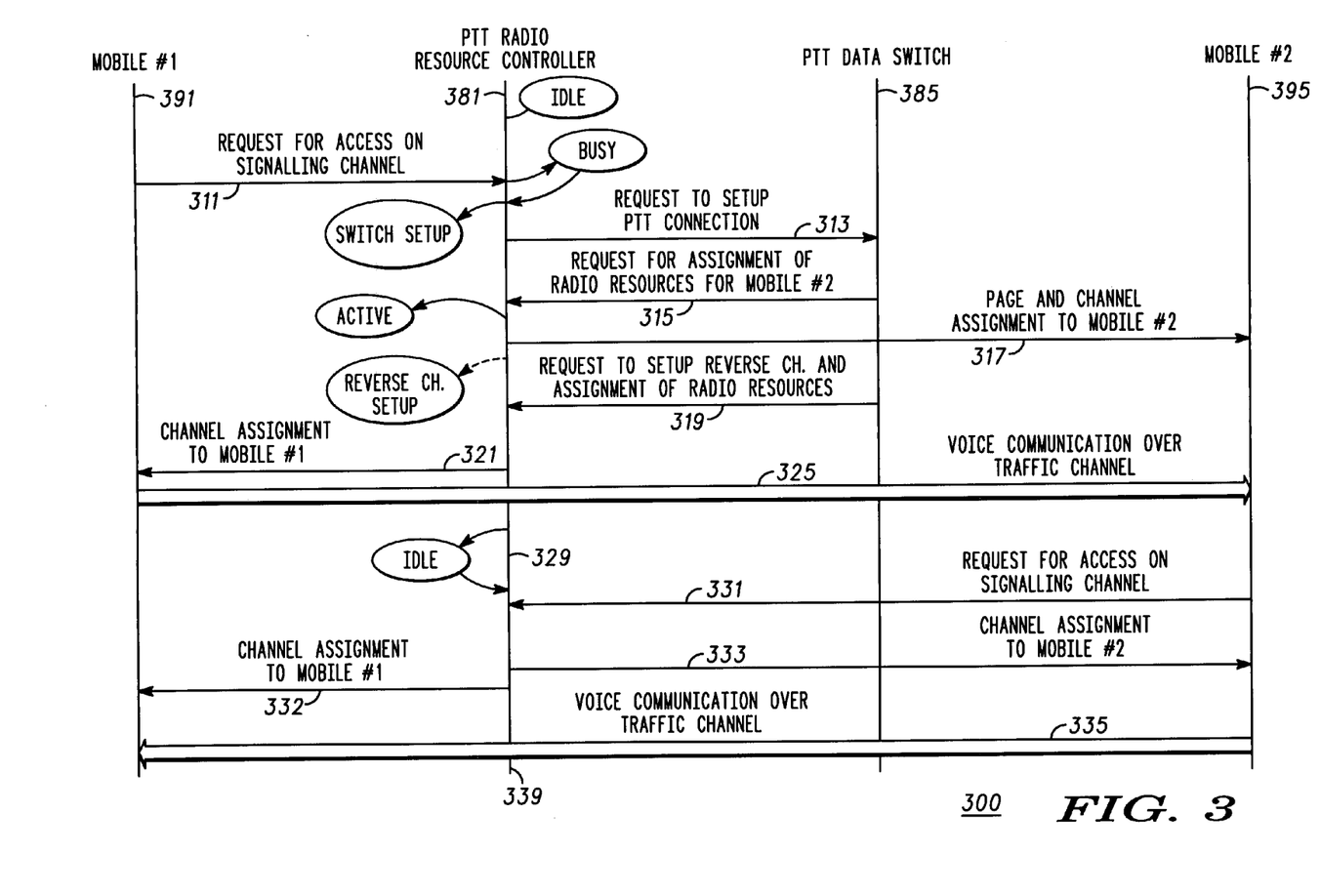
FIG. 3 shows a sample signal flow diagram for a push-to-talk system according to the preferred embodiment.

FIG. 3 shows a sample signal flow diagram 300 for a push-to-talk system according to the preferred embodiment. Vertical line 391 represents signaling to and from an originating mobile device that later becomes a called mobile device, such as mobile device 111 shown in FIG. 1. Vertical line 395 represents signaling to and from a called mobile device that later becomes an originating mobile device, such as mobile device 115 shown in FIG. 1. Vertical line 381 represents signaling to and from a PTT radio resource controller, such as the PTT radio resource controller 141 shown in FIG. 1. Vertical line 385 represents signaling to and from a PTT data switch, such as PTT data switch 151 shown in FIG. 1.

Initially, the PTT radio resource controller is in an Idle state, such as Idle state 210 shown in FIG. 1. When the originating mobile device sends a message 311 requesting access on a signaling channel, the PTT radio resource controller moves from the Idle state to a Busy state, such as the Busy state 220 shown in FIG. 2, for that originating mobile device. Assuming that a radio channel is available before a time-out, the PTT radio resource controller moves to a Switch Setup state, such as the Switch Setup state 230 shown in FIG. 2. At this point, the PTT radio resource controller sends a message 313 request to setup a PTT connection to a PTT data switch, such as the PTT data switch 151 shown in FIG. 1. The PTT data switch responds with a message 315 request for assignment of radio resources to the called mobile device.

At this point, the PTT radio resource controller moves to an Active state, such as the Active state 240 shown in FIG. 2. During this Active state, the PTT radio resource controller sends a message 317 page and channel assignment to the called mobile device as well as a message 321 channel assignment to the originating mobile device. Once the channel assignment messages 317, 321 have been received, voice communication 325 over a traffic channel from the originating device to the called mobile devices are possible.

While the PTT radio resource is in the Active state, the PTT radio resource sends a message 319 request to setup a reverse channel and assignment of radio resources. This message 319 request to set up a reverse channel may occur at any time while the PTT radio resource controller is in the Active state. For example, the messages 319 are shown to have occurred after message 317 page and channel assignment to the called mobile. However, the message 319 can alternately occur before message 317, after message 321, or after voice communication 325. The message 319 request to set up a reverse channel and assign radio resources can be sent using overhead messages or using a signaling channel while the PTT radio resource controller is active on the "forward" traffic channel. If multiple channels are available (e.g., 3G supports multiple data channels), then more than one channel can be used to set up one or more reverse channels.

Once the traffic channel "in use" timer expires, or another internal or external release trigger occurs for the "forward" channel, which indicates that the originating mobile device is inactive, the PTT radio resource controller returns to the Idle state for that mobile device and the "forward" channel is released using message 329 and those radio channel resources are available for subsequent assignment.

Meanwhile, User B, the user of the former called mobile device, seeks to respond to User A, the user of the former originating mobile device. Request for access on signaling channel message 331 from the current originating mobile device is sent to the PTT radio resource controller, which knows that radio resources have already been allocated on this "reverse" channel. Because the reverse channel has already been set up, the PTT radio resource controller sends a message 332 channel assignment to the former originating mobile device, which is now a called mobile device. The PTT radio resource controller also sends a message 333 channel assignment to the current originating mobile device, which is now an originating mobile device. Now, voice communication 335 over a traffic channel can occur from the present originating mobile device to the present called mobile device. When a "reverse" channel is not in use for a predetermined period of time, or another internal or external release trigger occurs, the reverse channel resources are released using message 339.

Figure 4:
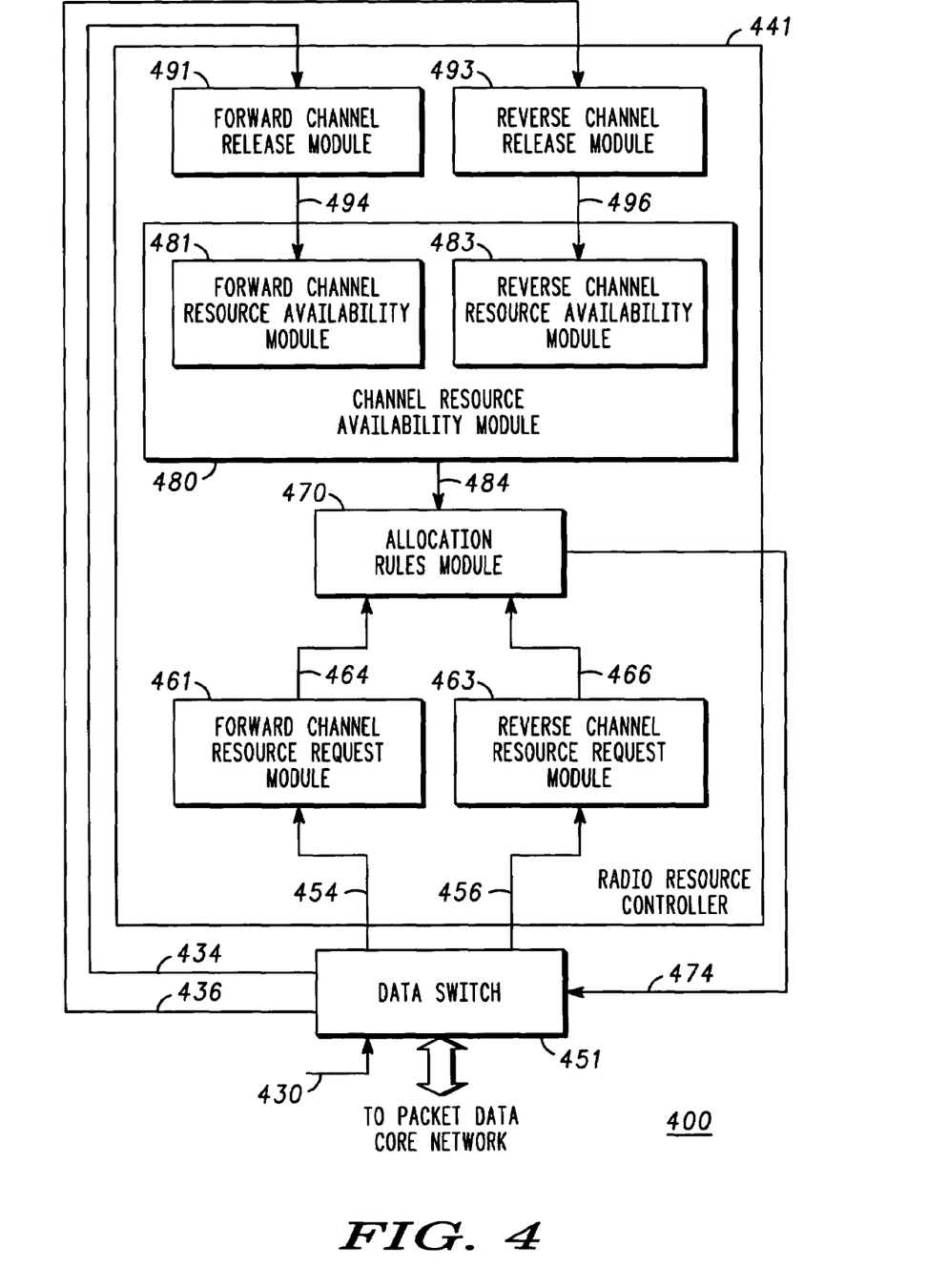
FIG. 4 shows an data network environment with a PTT radio resource controller and a PTT data switch according to the preferred embodiment.

FIG. 4 shows a data network environment 400 with a PTT radio resource controller 441 and a PTT data switch 451 according to the preferred embodiment. This data network environment 400 includes a PTT radio resource controller 441 that implements the state diagram 200 shown in FIG. 2 and the signal flows shown in FIG. 3. The data switch 451 communicates to the PTT radio resource controller 441 through a connection 454 to a forward channel resource request module 461 and a connection 456 to a reverse channel resource request module 463. The forward channel resource request module 461 has a connection 464 to an allocation rules module 470. The reverse channel resource request module 463 also has a connection 466 to the allocation rules module.

The allocation rules module 470 determines how channel resources should be allocated according to information received from the channel resource availability module 480, which keeps track of available free resources and busy resources, and various criteria such as priority of resource requests, timing of resource requests, time-of-day, and day-of-week. The allocation rules module 470 uses a connection 474 to the data switch 451 to communicate granted resource allocations to the various core networks 131, 135, 137 shown in FIG. 1.

When an external release trigger is received through port 430 by the data switch 451, connection 434 carries forward channel release trigger information to a forward channel release module 491 in the radio resource controller 441 and connection 436 carries reverse channel release trigger information to a reverse channel release module 493. Examples of forward channel external release triggers include: hanging up an originating mobile device, a voice-activated cue (e.g., "over and out") at the originating mobile device, and pressing a button on an originating mobile device. Examples of reverse channel external release triggers include: hanging up a called mobile device, a called party pressing a button to signal that the called mobile device will not respond, and the originating mobile device withdrawing a designation that a called mobile device is expected to respond.

In addition to external triggers for the release of forward and reverse channels, there are internal triggers for the release of forward and reverse channels. For example, if a forward channel is not being used for a predetermined period of time, as determined by a timer function in the forward channel release module 491, the forward channel release module 491 releases the resources being reserved by that forward channel. Similarly, if a reverse channel is not being used for a predetermined period of time, as determined by a timer function in the reverse channel release module 493, the reverse channel release module 493 releases the resources being reserved by that reverse channel.

As forward channel resources are released using forward channel release module 491, connection 494 communicates the availability of the released forward channel resources to the forward channel resource availability module 481, which is part of the channel resource availability module 480. Similarly, as reverse channel resources are released, connection 496 communicates the availability of the released reverse channel resources to the reverse channel resource availability module 483, which is also part of the channel resource availability module 484.

Thus, the data switch 451 provides forward and reverse channel resource requests to the radio resource controller 441, and the data switch 451 also provides external release triggers to the radio resource controller 441. Thus, the PTT radio resource controller 441 and the PTT data switch 451 cooperate to set up a forward channel in accordance with FIG. 2 and FIG. 3. Additionally, once a forward channel is active, the radio resource controller 441 and the data switch 461 cooperate to set up reverse channels according to FIG. 2. and FIG. 3. If either an external or internal release trigger occurs, the data switch 451 and the radio resource controller 441 direct the release of reserved channel resources, which can then be re-allocated by the allocation rules module 470.

By initiating a "reverse" channel prior to the originating mobile device releasing a PTT session, the called parties will be able to respond more quickly than if the reverse channel were set up according to a conventional method. This enables the called parties to invoke voice communications back to the originating party with a reduced call set-up delay. This method for reverse channel establishment can be extended to other peer-to-peer services and applications such as push-to-video.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A push-to-talk radio resource controller comprising:
    a forward channel resource request module, for requesting push-to-talk channel resources for forward traffic from an originating mobile device to at least one called mobile device;
    a reverse channel resource request module, for requesting push-to-talk channel resources for reverse traffic from the at least one called mobile device to the originating mobile device, before a forward push-to-talk circuit from the originating mobile device to the at least one called mobile device is released;
    an allocation rules module, coupled to the forward channel resource request module and the reverse channel resource request module; and
    a channel resource availability module, coupled to the allocation rules module.

2. A push-to-talk radio resource controller in accordance with claim 1 further comprising:
    a forward channel release module, coupled to the channel resource availability module; and
    a reverse channel release module, coupled to the channel resource availability module.

3. A push-to-talk radio resource controller in accordance with claim 1 wherein the channel resource availability module comprises:
    a forward channel resource availability module; and
    a reverse channel resource availability module.

4. A push-to-talk radio resource controller in accordance with claim 3 wherein the forward channel resource availability module comprises:
    a connection for receiving an external release trigger.

5. A push-to-talk radio resource controller in accordance with claim 3 wherein the reverse channel resource availability module comprises:
    a connection for receiving an external release trigger.

6. A push-to-talk radio resource controller in accordance with claim 3 wherein the forward channel resource availability module comprises:
    a timer for determining an internal release trigger.

7. A push-to-talk radio resource controller in accordance with claim 3 wherein the reverse channel resource availability module comprises:
    a timer for determining an internal release trigger.

8. A method for establishing a reverse channel in a push-to-talk (PTT) system comprising the steps of:
    initiating a forward PTT circuit for forward traffic from an originating device to at least a first called device;
    initiating a first reverse PTT circuit for reverse traffic from the first called device to the originating device before the forward PTT circuit is released;
    releasing the forward PTT circuit; and
    releasing the first reverse PTT circuit.

9. A method for establishing a reverse channel in a push-to-talk (PTT) system according to claim 8 further comprising the steps of:
    initiating a second reverse PTT circuit from a second called device to the originating device, before releasing the forward PTT circuit; and
    releasing the second reverse PTT circuit, before releasing the forward PTT circuit.

10. A method for establishing a reverse channel in a push-to-talk (PTT) system according to claim 8 further comprising the steps of:
    initiating a second reverse PTT circuit from a second called device to the originating device, before releasing the forward PTT circuit; and
    releasing the second reverse PTT circuit, before releasing the first reverse PTT circuit.

11. A method for establishing a reverse channel in a push-to-talk (PTT) system according to claim 10 further comprising the steps of:
    receiving a release trigger for the second called device, before releasing the second reverse PTT circuit.

12. A method for establishing a reverse channel in a push-to-talk (PTT) system according to claim 8 further comprising the steps of:
    initiating a second reverse PTT circuit from a second called device to the originating device, before releasing the forward PTT circuit; and
    releasing the second reverse PTT circuit, after releasing the first reverse PTT circuit.

13. A method for establishing a reverse channel in a push-to-talk (PTT) system according to claim 8 further comprising the steps of:
    receiving a request for access from the originating device, before initiating the forward PTT circuit.

14. A method for establishing a reverse channel in a push-to-talk (PTT) system according to claim 8 further comprising the steps of:
    receiving a request for access from the first called device, before releasing the first reverse PTT circuit.

15. A method for establishing a reverse channel in a push-to-talk (PTT) system according to claim 8 further comprising the steps of:
    receiving a release trigger for the originating device, before releasing the forward PTT circuit.

16. A method for establishing a reverse channel in a push-to-talk (PTT) system according to claim 15, wherein the release trigger is an external release trigger generated by the originating device.

17. A method for establishing a reverse channel in a push-to-talk (PTT) system according to claim 15, wherein the release trigger is an internal release trigger generated by a PTT radio resource controller.

18. A method for establishing a reverse channel in a push-to-talk (PTT) system according to claim 8 further comprising the steps of:
    receiving a release trigger for the first called device, before releasing the first reverse PTT circuit.

19. A method for establishing a reverse channel in a push-to-talk (PTT) system according to claim 18, wherein the release trigger is an external release trigger generated by the first called device.

20. A method for establishing a reverse channel in a push-to-talk (PTT) system according to claim 18, wherein the release trigger is an internal release trigger generated by a PTT radio resource controller.

\* \* \* \* \*